United States Patent [19]
Vitale

[11] 4,126,268
[45] Nov. 21, 1978

[54] PORTABLE ROOM-TEMPERATURE CONTROLLER

[76] Inventor: John E. Vitale, 559 Manchester Rd., Yorktown Heights, N.Y. 10598

[21] Appl. No.: 770,231

[22] Filed: Feb. 18, 1977

[51] Int. Cl.² .................... F24H 3/06; F28F 13/12
[52] U.S. Cl. .............................. 236/38; 98/39; 165/122
[58] Field of Search ............ 236/38, 49; 98/40 C, 98/39; 165/122

[56] References Cited

U.S. PATENT DOCUMENTS

| 1,665,801 | 4/1928 | Sweatt | 236/38 |
| 3,265,859 | 8/1966 | Castello et al. | 98/40 C |
| 3,648,591 | 3/1972 | Winnett | 98/39 |
| 3,768,549 | 10/1973 | Goodie et al. | 165/122 |
| 3,918,354 | 11/1975 | Lambert | 98/114 |

Primary Examiner—William E. Wayner
Attorney, Agent, or Firm—Karl F. Ross

[57] ABSTRACT

A portable forced air unit having a housing provided with an air driving element arranged between an air inlet and an air outlet, the air outlet feeding the forced air beneath a fixed room heat exchanger e.g. baseboard or convector heater with which the unit is designed to operate. Thermostats, responsive to the temperature of the room in which the unit is operating and the temperature of the heat exchanger, serve to control the air driving element.

11 Claims, 5 Drawing Figures

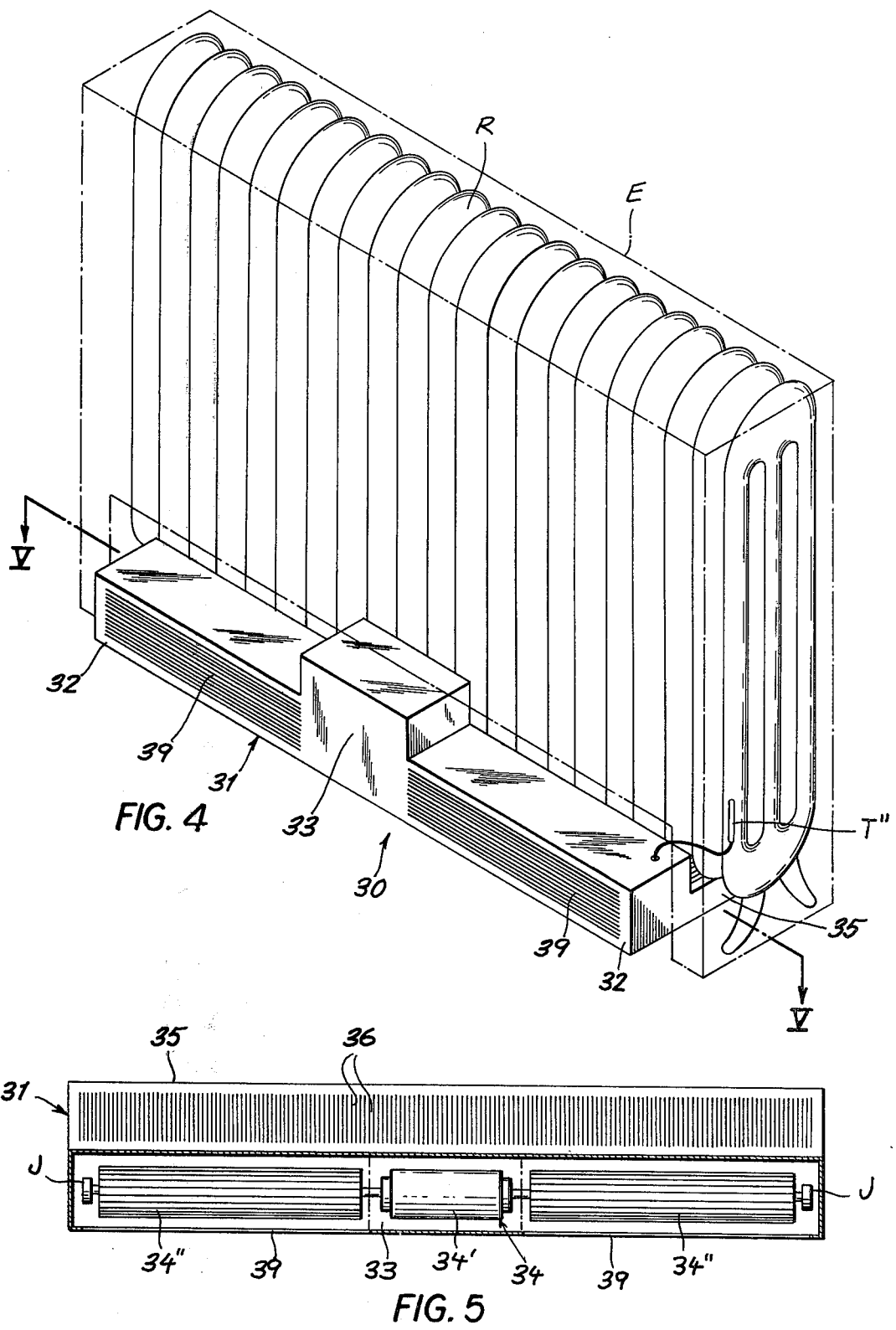

PORTABLE ROOM-TEMPERATURE CONTROLLER

FIELD OF THE INVENTION

The present invention relates, in general, to a forced air heater for use in local temperature control, and, more particularly, to a portable forced air unit to be used in combination with fixed room heat exchangers, e.g. a hot-water or electric baseboard heater or a convector-type room heater.

BACKGROUND OF THE INVENTION

Forced air heaters are well known in the art and usually comprise a fan or blower contained in a housing with a heat exchanger of either the electrical type or the conduit type through which hot water or steam is circulated.

The conduit type of forced air heater has a large heating capacity and is therefore usually a permenant installation which lacks portability, whereas the electrical type of forced air heaters are usually more portable, but lack the large heating capacity of the conduit types.

The present invention is intended for home use and takes advantage of the fact that most homes are provided with high capacity heating systems which depend on convection or radiation for the distribution of heated air, the systems usually being controlled by a centrally located thermostat, which is responsive to the temperature in the immediate vicinity of the thermostat, the entire system being turned on and off according to that temperature.

This type of operation of most home heating systems gives rise to the problem of some rooms being underheated while others are overheated, causing the system to operate inefficiently, especially since individual rooms cannot be independently controlled and it is complicated and expensive to provide heat-output control for an individual space heater which is permanently emplaced.

The heating requirements of any given room are not necessarily identical to those of another room, the differences depending on the number of windows, whether or not they are facing the prevailing winds and the amount of sunlight they receive, and the needs of the user.

It can be argued that the answer to this problem is to turn the heat off in those rooms which are usually warmer while leaving the heat on in the colder rooms. The drawback with this approach is that the conditions which make some rooms warmer than others are changable, so that if a normally warmer room is deprived of heat from the central system and the conditions which make that room normally warmer change, the heat in that room will have to be turned on, causing an imbalance in the system and a greater consumption of fuel, not to mention the inconvenience of having to turn the heat on and off.

OBJECTS OF THE INVENTION

It is therefore an object of the present invention to provide an improved heating system adapted to obviate the aforementioned drawbacks.

It is another object of the present invention to provide an improved forced air unit which is portable and can be used for local temperature control in conjunction with a central heating system.

SUMMARY OF THE INVENTION

The above and other objects of the invention are realized by the combination of a portable forced air unit, itself free from any heating element, with a fixed room heat exchanger. The forced air unit has a housing in which is provided means for forcing air through an elongated outlet formed in the housing, which directs it beneath the heat exchanger against which the forced air unit has been placed.

In a particular feature of the invention, the housing of the unit is elongated to form an air duct, with a motor-driven fan or centrifugal blower provided at one end. A projection of the housing extends beneath the heat exchanger, which can be a hot-water or electric baseboard heater, and is formed with an upwardly facing elongated air outlet which directs the forced air upwardly through the baseboard heater.

In another feature of the invention, the above-described embodiment can be provided with a series of baffles arranged along the air duct between the air driving element and the outlet for directing the forced air evenly through the outlet. It should be noted that in all embodiments of the invention, the air inlet is always formed remote from the outlet, on a side of the housing which faces away from the heat exchanger, so that only room air to be heated is drawn into the unit and not already heated air from the exchanger.

In still another embodiment of the invention, the housing can have the air forcing element provided in the center of the structure, with the elongated air ducts extending from either side. In this case, the air forcing element can be a motor-driven transverse flow blower (crossflow-blower), with the blades of the blower extending on either side of the motor into the air ducts.

In yet another embodiment of the invention, the projection formed on the housing can be eliminated and the elongated outlet formed directly on the housing for feeding forced air beneath a convector type heat exchanger or a radiator type heat exchanger.

It is another feature of the invention that any of the above embodiments can be provided with a thermostat responsive to the room temperature, so that the forced air unit can turn on and off at predetermined room temperatures.

In yet another feature of the invention any of the above-described embodiments can be provided with a thermostat responsive to the temperature of the heat exchanger, the thermostat being provided on the outside of the housing and brought into contact with the heat exchanger when the forced air unit is placed in position against the exchanger. This feature allows the unit to be controlled by the temperature of the heat exchanger so that if the heat is insufficient or nonexistant, the forced air unit will shut off and not turn on again until there is sufficient heat in the exchanger. This prevents the circulation of cold air.

It is still a further feature of the invention in that any of the above mentioned embodiments can be provided with both types of thermostats connected in series, so that each can override the other. For instance, if the temperature of the room in which the forced air unit is operating becomes too cold, the unit will turn on, provided there is sufficient heat in the exchanger. Once the unit is on, if the room temperature becomed too high or the exchanger becomes too cold, the unit will shut off. With this feature, the room temperature range can be predetermined and in the event that the central heating system is not providing enough heat, the unit will not operate, avoiding the possibility of the unit operating without heat and making the room even colder.

In a final feature of the invention, any of the embodiments can be provided with a housing extension adapted to fit on an air duct having a removable end wall, thereby allowing the forced air unit to be made longer.

BRIEF DESCRIPTION OF THE DRAWING

The above and other objects, features and advantages of the invention will become more readily apparent from the following description, reference being made to the accompanying drawing, in which:

FIG. 4 is a diagrammatic perspective view of still another embodiment of the invention; and FIG. 5 is a sectional view taken along line V—V of FIG. 4.

SPECIFIC DESCRIPTION

Figure 1:
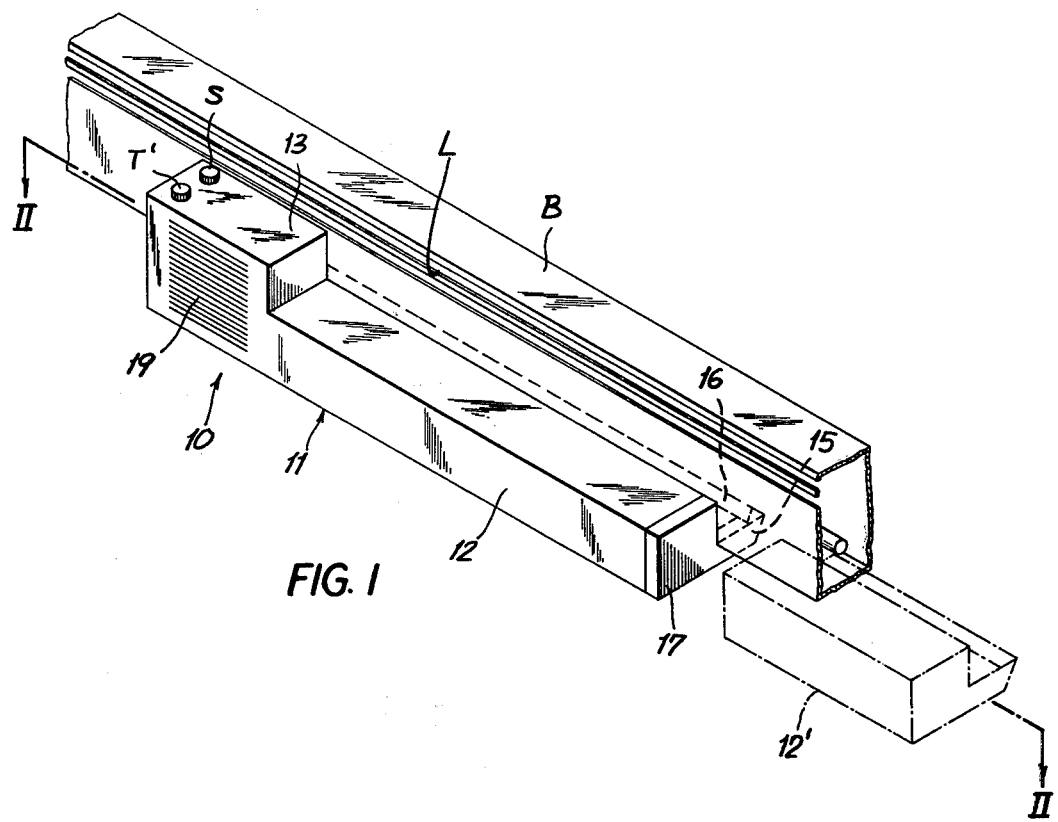
FIG. 1 is a diagrammatic perspective view of the forced air unit according to the invention.
Figure 2:
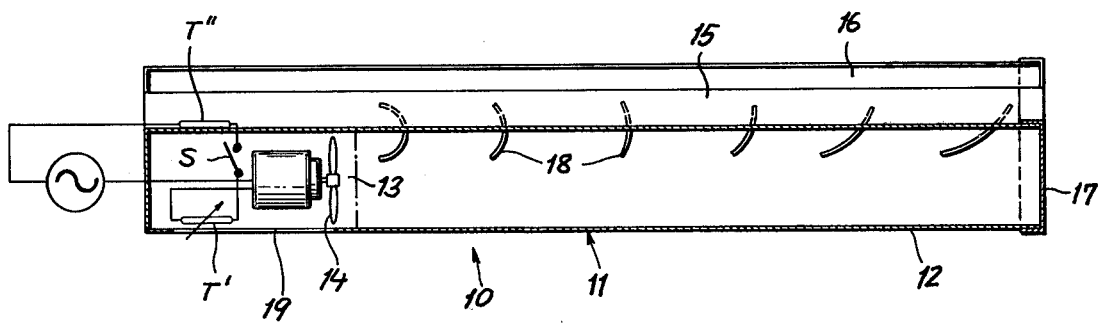
FIG. 2 is a sectional view taken along line II—II of FIG. 1.

FIG. 1 shows the forced air unit 10 in position in front of a baseboad type heat exchanger B with which it will operate. The forced air unit 10 has an elongated housing 11 which lies below the outlet forming an air duct 12, at one end of which is an enlarged portion 13 which houses a motor driven fan 14. A projection 15, having the same length as the housing 11, extends beneath the heat exchanger B and is formed with an upwardly facing elongated air outlet 16. A removable cap 17 is provided at the end of air duct 12, which can be elongated even further by an extension 12'. A series of baffles 18, as seen in FIG. 2, are arranged along the duct 12 between the fan 14 and the outlet 16 for directing the forced air evenly through the outlet 16. The motor driven fan 14 is controlled by a pair of thermostats T' and T" which are connected in series between the fan 14 and a power source, the thermostat T' being adjustable and responsive to the temperature of the room, while the thermostat T" is in contact with the heat exchanger B and responsive to the temperature thereof. A switch S is provided in the circuit for energizing or deenergizing the system.

In operation, air is drawn into the enlarged portion 13 through an inlet 19, formed in the rear of housing 11 remote from the outlet 16, by the fan 14 where it is forced along duct 12 and engaged and directed by baffles 18 into the projection 15 and out of the outlet 16, upwardly through the heat exchanger B, which is open along the underside, the heat emerging through louvers L along the upper front portion.

Figure 3:
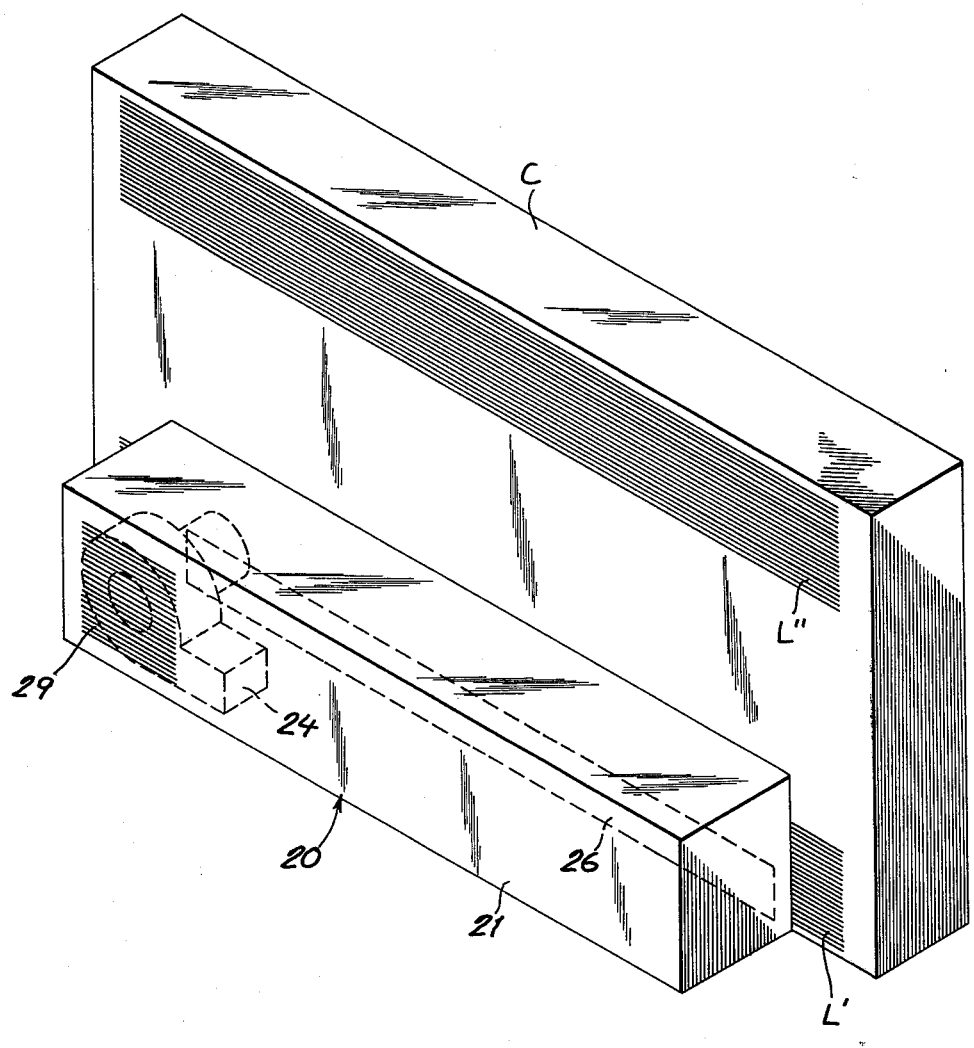
FIG. 3 is a diagrammatic perspective view of another embodiment of the invention.

The forced air unit 20 shown in FIG. 3 can be operated in combination with a convector type heat exchanger C, formed with intake louvers L' and outlet louvers L". The unit 20 has a housing 21 provided with an elongated air outlet 26 which feeds into the intake louvers L' when the unit 20 is positioned in front of the convector C for operation. A centrifugal blower 24 is provided at one end of the housing 21 and draws air through an inlet 29, forcing it down the length of housing 21 where it is directed through outlet 26 and beneath the convector type heat exchanger.

In another embodiment of the invention, the forced air unit 30 is shown positioned in FIG. 4 against a radiator type heat exchanger R, having an enclosure E shown in phantom lines (thereby effectively making the space heater a convector). The unit housing 31 has an enlarged central portion 33 with air ducts 32 extending on either side. A projection 35, running the length of housing 31, extends beneath the radiator R and is provided with a series of upwardly facing slotted openings 36, positioned transverse to the length of the unit 30 and coextensive therewith, as can best be seen in FIG. 5. The central portion 33 houses a motor 34' which is the driving element of a transverse flow blower 34 having blades 34" extending on either side of motor 34' substantially the length of the ducts 32 and journaled at their ends in supports J. The thermostat T" for controlling the blower 34 is shown in this embodiment to be mounted directly on the heat exchanger R, externally of the housing 31, as opposed to that shown in FIG. 1 where it is mounted on the outside of the housing 11 and brought into contact with a heat exchanger when positioned for operation.

The air flow from the blower 34 is substantially evenly distributed over the full length of the housing 31, so that air drawn in through the inlets 39 need not be directed by baffles, the slotted outlets 36 serving to make the flow quite laminar.

It should be noted that any of the above described air driving elements can be easily adapted to operate in any of the described housing configurations along with any combination of thermostats as described. Note further that, where the output of the permanent space heater, e.g. a convector, is to be limited except where called for by the thermostat of the unit, the latter blocks the flow of air through the convector. The unit can be battery powered as well as driven by line current. It can be used in the home, in office buildings, apartment houses and industrial establishments.

I claim:

1. The combination with a fixed heat exchanger, disposed above the floor of a room, of a unit for forcing air through said heat exchanger, said unit comprising:

an elongated housing portably resting on the floor wholly below the air outlet of said heat exchanger, said housing having a large cross-section portion forming an air duct and lying in front of said heat exchanger, and a projection formed on said housing and integral with said large cross-section portion and extending over substantially the entire length thereof, said projection communicating with said duct and being of smaller cross section than said large portion;

an elongated air outlet formed in said projection facing upwardly for directing forced air upwardly through said heat exchanger;

an air inlet formed in said large portion facing away from said heat exchanger for drawing in room air;

means provided in said large portion between said inlet and said elongated outlet for forcing air therethrough; and a thermostat in said housing connected to said air forcing means and responsive to the temperature of said room for controlling said air forcing means.

2. The combination defined in claim 1 wherein: said fixed heat exchanger is a convector.

3. The combination defined in claim 1 wherein: said fixed room heat exchanger is a radiator.

4. The combination defined in claim 1 wherein said fixed heat exchanger is a baseboard heater.

5. The combination defined in claim 1 wherein:
said large portion is provided with said air forcing means at one end thereof; and
a plurality of baffles are arranged along said air duct between said air-forcing means and said elongated outlet for distributing the forced air evenly through said outlet.

6. The combination defined in claim 1 wherein:
said air forcing means is provided in the center of said elongated housing in an enlarged space with said air duct extending on either side.

7. The combination defined in claim 5 wherein:
the end of said air duct opposite said air forcing means is removable; and
an extension of a configuration identical to said air duct is fitted thereon to elongate said housing.

8. The combination defined in claim 1 wherein:
said air forcing means is an electrically driven transverse flow blower.

9. The combination defined in claim 1 wherein:
said air forcing means is an electrically driven fan.

10. The combination with a fixed heat exchanger, disposed above the floor of a room of a unit for forcing air through said heat exchanger, said unit comprising:
an elongated housing portably resting on the floor wholly below the air outlet of said heat exchanger, said housing having a large cross-section portion forming an air duct and lying in front of said heat exchanger, and a projection formed on said housing and integral with said large cross-section portion and extending over substantially the entire length thereof, said projection communicating with said duct and being of smaller cross section than said large portion;
an elongated air outlet formed in said projection facing upwardly for directing forced air upwardly through said heat exchanger;
an air inlet formed in said large portion facing away from said heat exchanger for drawing in room air;
means provided in said large portion between said inlet and said elongated outlet for forcing air therethrough; and
a thermostat on said housing connected to said air forcing means and responsive to the temperature of said heat exchanger for controlling said air forcing means.

11. A unit for forcing air through a heat exchanger disposed above the floor of a room comprising:
an elongated housing portably resting on the floor wholly below the air outlet of said heat exchanger, said housing having a large cross-section portion forming an air duct and lying in front of said heat exchanger, and a projection formed on said housing and integral with said large cross-section portion and extending over substantially the entire length thereof, said projection communicating with said duct and being of smaller cross section than said large portion;
an elongated air outlet formed in said projection facing upwardly for directing forced air upwardly through said heat exchanger;
an air inlet formed in said large portion facing away from said air outlet for drawing in room air;
means electrically driven provided in said large portion between said inlet and said outlet for forcing air therethrough;
a first thermostat provided in said housing connected to said air forcing means and responsive to the temperature of said room air for controlling said air forcing means; and
a second thermostat provided in said housing connected to said air forcing means and responsive to the temperature of said heat exchanger for controlling said air forcing means.

* * * * *